United States Patent
Caldwell

[15] 3,650,096
[45] Mar. 21, 1972

[54] MULTIPLE SECTION FOLDABLE FLAIL-TYPE MOWER OR SHREDDER

[72] Inventor: Frederick C. Caldwell, Corpus Christi, Tex.

[73] Assignee: E. L. Caldwell & Sons, Inc., Corpus Christi, Tex.

[22] Filed: Sept. 24, 1969

[21] Appl. No.: 860,629

[52] U.S. Cl. .................................................56/7
[51] Int. Cl. .........................................A01d 75/30
[58] Field of Search................................56/6, 7, 26, 504, 505

[56] References Cited

UNITED STATES PATENTS

| 2,704,921 | 3/1955 | Cunningham, Jr. | 56/7 |
| 2,724,227 | 11/1955 | Godwin | 56/7 |
| 3,400,521 | 9/1968 | Caldwell | 56/6 |

FOREIGN PATENTS OR APPLICATIONS 774,830   1/1968   Canada..................................56/504

Primary Examiner—Louis G. Mancene
Assistant Examiner—J. A. Oliff
Attorney—B. P. Fishburne, Jr.

[57] ABSTRACT

A tractor-drawn multiple section flail machine has its individual flail rotors powered from a single power takeoff shaft of the tractor coupled through suitable transmission means. The outboard flail sections are foldable so that the machine can meet highway specifications or pass through a relatively narrow gate. It is capable of cutting a wide swath when extended and the individual flail sections can follow ground contours. Unlike conventional rotary mowers, the flail rotors do not tend to throw rocks or other debris outwardly, thereby rendering the machine safe for use in public places.

6 Claims, 4 Drawing Figures

INVENTOR
FREDRICK CLAY CALDWELL

BY B.P. Fishburn, Jr.

ATTORNEY

MULTIPLE SECTION FOLDABLE FLAIL-TYPE MOWER OR SHREDDER

A need exists in the art for a flexible folding multi-section flail-type mower or shredder for use on highway medians, airports and other like large areas. These flail machines are comparatively safe as their transverse horizontal axis rotors carrying many flail knives do not tend to cast rocks and debris out from under the skirt of the machine as so often happens with vertical axis rotary mowers.

Single unit flail mowers and shredders are known in the art, for example, U.S. Pat. Nos. 2,952,466; 2,974,888 and 2,987,868 show single unit machines of this type. Additionally, a similar flail machine is manufactured and sold by E. L. Caldwell & Sons, Inc. of Corpus Christi, Texas under the name SHARK flail shredder. Apparently, due to difficulties in connecting multiple sections and powering the horizontal flail rotors of such sections, plural unit folding machines of this type have not been provided. These problems having been solved in connection with the present invention a plural section transverse horizontal axis folding flail mower or shredder is provided which has the previously noted features of safety, flexibility and economy. The machine is rugged and durable and simplified means are provided to transfer power from the tractor power takeoff shaft to the several machine rotors. The rotors per se of the individual units or sections may be conventional. Power to the rotors may be transmitted mechanically, as through gear boxes and universal joints, through chain drives, or hydraulically, in some instances.

BRIEF DESCRIPTION OF DRAWING FIGURES -

DETAILED DESCRIPTION -

Figure 1:
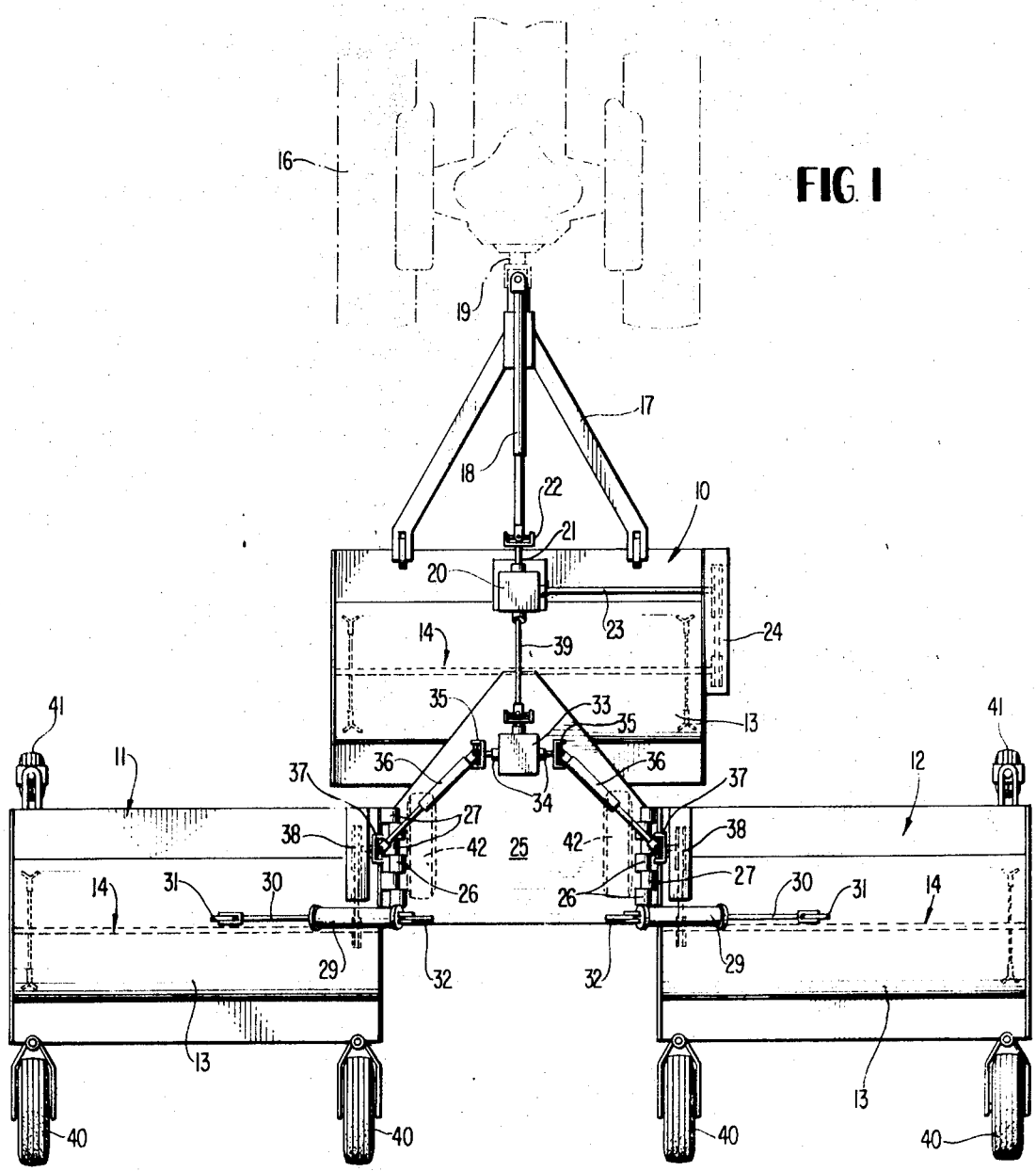
FIG. 1 is a plan view of a plural section folding flail mower or shredder embodying the present invention in the extended condition.
Figure 3:
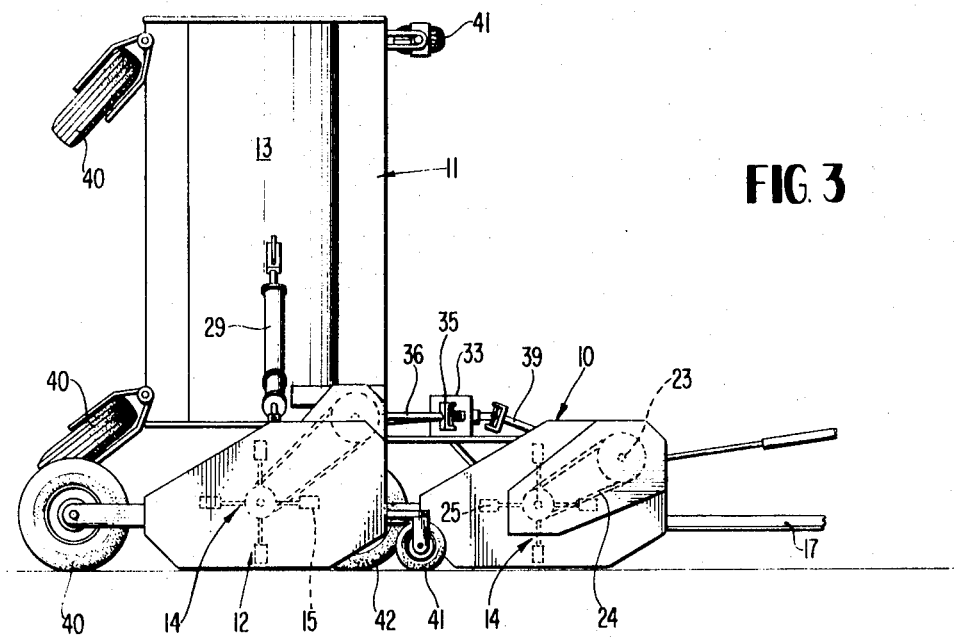
FIG. 3 is a side elevation of the machine with one outboard section folded upwardly.
Figure 4:
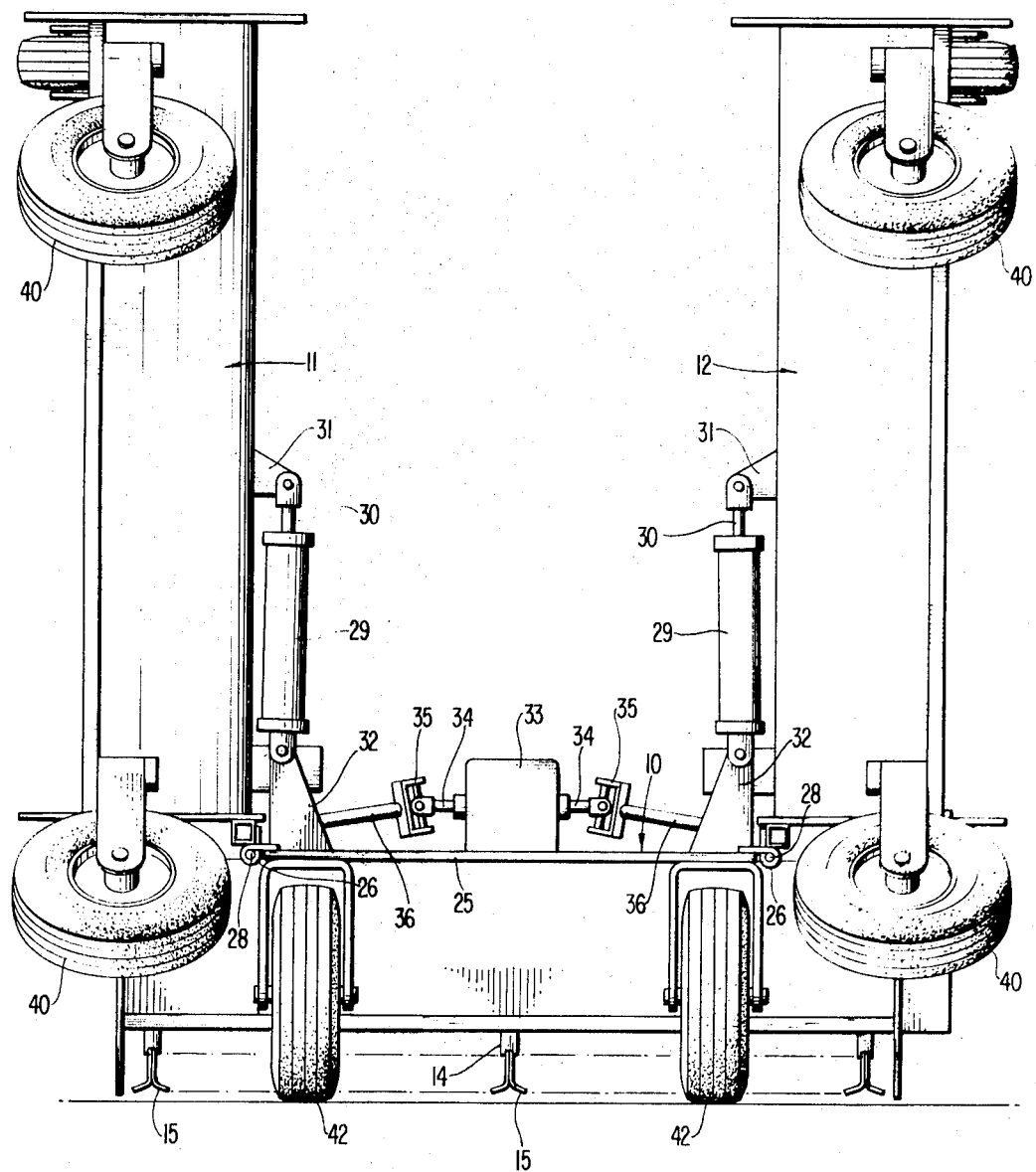
FIG. 4 is an enlarged rear elevational view showing both outboard sections folded upwardly to substantially vertical positions.

Referring to the drawings in detail wherein like numerals designate like parts throughout the same, the numeral 10 designates a leading center section or unit of a three section folding flail-type mower or shredder having a rearward laterally aligned pair of outboard sections 11 and 12 adapted to be folded upwardly substantially vertically relative to the center leading section, as shown in FIG. 4. Each section 10, 11 and 12 of the three section flail machine has a sturdy rectangular sheet metal housing or cover 13 substantially enclosing the flail rotor at the top and on all sides for safety purposes. Each section of the machine has an individual transverse horizontal axis flail rotor 14 beneath its housing 13, FIG. 3, and the rotors per se may be conventional of the types shown in the aforementioned U.S. Pats. No. 2,952,466 and 2,974,888 or in the flail machine produced by E. L. Caldwell & Sons, Inc. Therefore, the details of the flail rotor 14 need not be shown or described in this application for a full and proper understanding of the invention, and for simplicity of illustration, only fragments of the three rotors 14 are shown in the drawings. It is sufficient to state that, as shown in said prior patents, each transverse horizontal axis flail rotor is journaled for rotation in suitable bearing means provided on the housing 13 and the rotors extend for the full lengths of the housings, as shown in the drawings. Each rotor 14 includes a multiplicity of pivoted free-swinging flail knives 15 along its axis, as shown in said patents. These flail knives are extended radially by centrifugal force and pass close to the ground so as to thoroughly chop up and shred all grass and other growth in the path of the machine. As shown best in FIG. 1, when the three sections 10, 11 and 12 of the machine are extended for use, there is a slight overlap of the ends of the rotor 14 of the leading section 10 with the inner ends of the flail rotors 14 of the trailing outboard sections 11 and 12, so that there is no gap in the swath or path cut by the machine.

The leading center machine section 10 is coupled to the drawbar of a farm tractor 16 by a suitable draft tongue 17 and a leading telescoping drive shaft 18 at the center of the leading section 10 transmits power to the multiple section machine from the power takeoff extension 19 of the tractor. A first gear box 20 containing conventional bevel gears or the like is mounted on the front and center portion of the housing 13 of leading section 10 and had its input shaft 21 coupled with the drive shaft 18 through a universal joint 22. A lateral output shaft 23 from gear box 20 immediately above the housing 13 of flail section 10 leads to chain or belt gearing 24 enclosed on one side of the unit 10, said gearing in turn driving the transverse horizontal flail rotor 14 of the unit 10.

Figure 2:
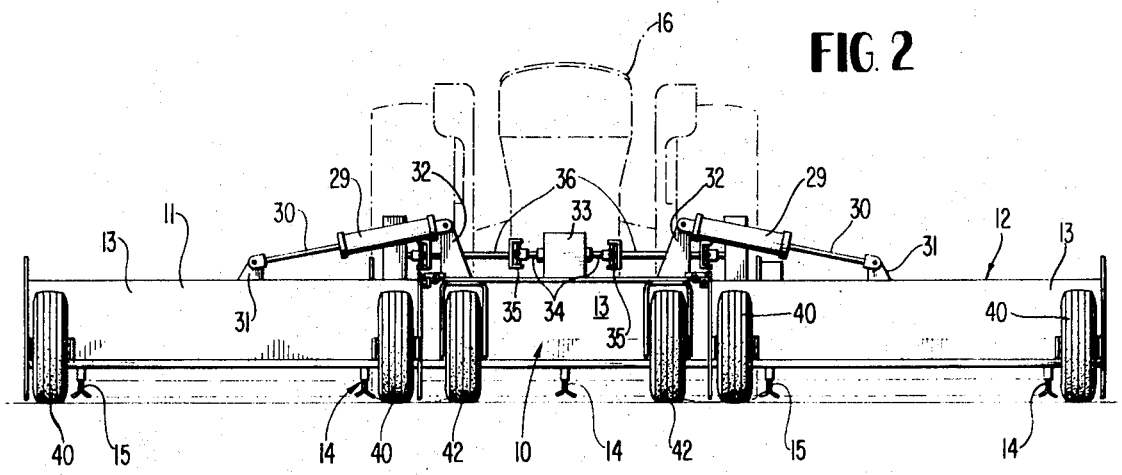
FIG. 2 is a rear elevation thereof.

The leading flail unit 10 has a rearwardly extending horizontal platform extension 25 suitably rigidly anchored thereto and extending into the space between the rearward outboard sections 11 and 12. The platform extension 25 has sturdy hinge knuckles 26 secured thereto along its opposite longitudinal edges for interfitting relationship with knuckles 27 on the inner sides of the units 11 and 12. Suitable pintles 28, FIG. 4, engage through these knuckles to form a piano-type hinge along each side of the platform extension 25 and along those portions of the units 11 and 12 which are coextensive with the platform extension 25. The two outboard flail sections or units 11 and 12 are thus hingedly secured to the platform extension 25 of leading unit 10 so that the outboard units may be raised and lowered between their positions of FIG. 2 and FIG. 4.

Power means for raising and lowering the outboard units 11 and 12 and locking them is provided in the form of a pair of generally horizontal transverse extensible and retractable power cylinders 29 at the rear end of platform extension 25. The rods 30 of these power cylinders are anchored to brackets 31, rigidly secured to flail housings 13. The cylinders proper are pivoted to the tops of elevated brackets 32 rigidly secured to platform extension 25 near the rearward corners thereof. It may be readily seen that retraction of the power cylinders 29 will elevate the side or outboard flail units 11 and 12 toward their fully folded positions of FIG. 4. The cylinders 29 are conventionally controlled by valving on the tractor 16 in ready reach of the tractor driver and the two cylinders are independently operable so that one or both of the units 11 or 12 may be raised and lowered. When the cylinders 29 are fully extended, FIG. 1, the hinged outboard units 11 and 12 are free-floating and may follow independently the irregularities and contours of the ground. The cylinders 29 may be identical to the cylinders 42 and 43 employed for a similar purpose in U.S. Pat. No. 3,400,521 to Caldwell.

A power divider gear box 33 is fixedly mounted on the forward portion of platform extension 25 at the longitudinal center of the machine and directly rearwardly of gear box 20 and somewhat forwardly of units 11 and 12. Lateral output shafts 34 of this power divider gear box are coupled through universal joints 35 with telescoping drive shafts 36 similar to the shafts 62 and 63 of U.S. Pat. No. 3,400,521. These drive shafts 36 diverge rearwardly, FIG. 1, and are coupled through additional universal joints 37 with belt or chain gearing 38 on the inner sides of outboard units 11 and 12, such gearing connected with and driving the transverse horizontal flail rotors 14 of units 11 and 12. The two gear boxes 20 and 33 are operatively interconnected through a longitudinal drive shaft 39, as shown.

The rearward ends of flail units 11 and 12 are supported by caster wheels 40 and conventional height adjustments for the machine may be included. The front outboard corners of the units 11 and 12 are further supported by dolly wheels 41. Additional wheels 42 underlie and support the extension 25 near the hinges composed of the knuckles 26 and 27.

In view of the foregoing description, it is believed that the operation of the flail machine is already understandable. Briefly, when the machine is coupled to the tractor 16, as shown, rotation of the tractor power takeoff shaft 19 through the drive shaft 18 and gear box 20 will drive the flail rotor 14 of forward unit 10 through the lateral shaft 23 and gearing 24. Simultaneously, the rearward flail rotors 14 will be driven through gearing 38, shafts 36 and divider gear box 33, which receives power from the front gear box 20 through shaft 39. With the three units 10, 11 and 12 unfolded as in FIGS. 1 and 2, a wide swath may be cut through grass or the like.

The operator on the tractor seat through conventional hydraulic controls and without leaving the tractor may retract the cylinders 29 in unison or independently to raise up the outboard units 11 and 12 for a full 90°, FIG. 4, so that the machine may travel on a highway without violation or may pass through a farm gate as little as 8 feet wide.

In lieu of the mechanical gearing which transmits power from the tractor to the three flail rotors 14, other forms of drive may be employed. For example, a hydraulic pump may replace the gear box 20 and may be driven by the shaft 18, and from this pump, individual hydraulic motors on the units 10, 11 and 12 may power the rotors 14. Such a conventional hydraulic power drive is shown in U.S. Pat. No. 2,920,434 and a similar system may be employed if desired. Alternatively, a chain drive may be utilized between the gear boxes 20 and 33 and from the gear boxes to the flail rotor shafts.

The machine is characterized by simplicity, compactness and ruggedness of structure. It is adapted to conform automatically to the contours of the ground and may, for example, be used to mow along highway medians which include sloping surfaces and level surfaces. The many features and advantages of the machine will now be readily apparent to those skilled in the art without the necessity for further description herein.

It is to be understood that the form of the invention herewith shown and described is to be taken as a preferred example of the same, and that various changes in the shape, size and arrangement of parts may be resorted to, without departing from the spirit of the invention.

I claim:

1. A tractor drawn trailer type foldable flail gang mower having an intended direction of travel; adapted to be powered from a single takeoff shaft on a tractor, said mower comprising a triangular array of flail mower units including a forward center mower unit and rear side mower units spaced rearwardly of, relative to said intended direction of travel, said forward center mower unit, draft means on the forward center mower unit adapted to be coupled to a towing element on a tractor, hinge means coupling the rear side mower units to opposite sides of the forward center mower unit and enabling the rear mower units to swing upwardly and downwardly relative to the forward mower unit, power means interconnecting said forward and rear mower units and operable to swing the rear mower units upwardly to substantially vertical inactive positions and to lower them, each mower unit having a transverse axis flail mowing rotor including a transverse rotor shaft, forward and rear transmission units on the forward mower unit in spaced relation and being drivingly interconnected to operate in unison, the forward transmission unit including an input shaft adapted to be coupled to said single takeoff shaft of the tractor, drive gearing interconnecting the forward transmission unit with the transverse shaft of the flail rotor of the forward mower unit, and additional separated drive gearing interconnecting the rear transmission unit with the transverse shafts of the flail rotors of the rear mower units.

2. The structure of claim 1, and said forward and rear transmission units on the forward mower unit comprising a pair of gear transmission units, each having an input shaft and a pair of output shafts.

3. The structure of claim 1, and said power means interconnecting said forward and rear mower units comprising an opposed pair of transversely arranged extensible and retractable fluid pressure cylinder-piston units.

4. The structure of claim 1, and ground-engaging wheels at least on the rear portion of the forward mower unit and on the rears of the rear side mower units.

5. The structure of claim 2, and said first-named drive gearing including a single transverse drive shaft secured to one output shaft of the forward transmission unit, and driving connecting means between such drive shaft and the transverse flail rotor shaft of the forward mower unit.

6. The structure of claim 2, and said additional separated drive gearing comprising a pair of telescoping drive shafts each having a connection with one output shaft of said rear transmission unit, and driving connecting means between each telescoping drive shaft and the transverse flail rotor shaft of one rear mower unit.

* * * * *